(12) United States Patent
Morgan et al.

(10) Patent No.: US 12,450,415 B2
(45) Date of Patent: Oct. 21, 2025

(54) LIBRARY DESIGN AND CO-OPTIMIZATION WITH A CIRCUIT DESIGN

(71) Applicant: Synopsys, Inc., Mountain View, CA (US)

(72) Inventors: Van Edward Morgan, Phoenixville, PA (US); David John Seibert, Mountain View, CA (US); Maurizio Damiani, San Francisco, CA (US); Abhijeet Chakraborty, Saratoga, CA (US); Tsuwei Ku, Milpitas, CA (US); Mohammad Ziaullah Khan, Folsom, CA (US)

(73) Assignee: Synopsys, Inc., Sunnyvale, CA (US)

(*) Notice: Subject to any disclaimer, the term of this patent is extended or adjusted under 35 U.S.C. 154(b) by 867 days.

(21) Appl. No.: 17/705,137

(22) Filed: Mar. 25, 2022

(65) Prior Publication Data

US 2022/0318475 A1  Oct. 6, 2022

Related U.S. Application Data

(60) Provisional application No. 63/169,757, filed on Apr. 1, 2021.

(51) Int. Cl.
*G06F 30/392* (2020.01)
*G06F 111/06* (2020.01)
*G06F 111/20* (2020.01)

(52) U.S. Cl.
CPC ........ *G06F 30/392* (2020.01); *G06F 2111/06* (2020.01); *G06F 2111/20* (2020.01)

(58) Field of Classification Search
USPC ........................................................ 716/119
See application file for complete search history.

(56) References Cited

U.S. PATENT DOCUMENTS

| | | | |
|---|---|---|---|
| 2018/0278253 A1* | 9/2018 | Lu | H03K 5/135 |
| 2019/0211475 A1* | 7/2019 | Ito | G06F 30/398 |
| 2020/0082032 A1* | 3/2020 | Hills | G06F 30/398 |
| 2022/0318475 A1* | 10/2022 | Morgan | G06F 30/392 |

* cited by examiner

*Primary Examiner* — Mohammed Alam
(74) *Attorney, Agent, or Firm* — Fenwick & West LLP

(57) ABSTRACT

A system expands an existing library based on simultaneous optimization of a circuit design being built and the library cells being used. The system receives a library of cells and a circuit design and performs synthesis and optimization of the circuit design. The system evaluates the circuit design to identify portions that may be candidates for new library cells. The system analyzes the library to determine whether there is an existing library cell that can be used, whether the new libcell should be added to the library, or whether the new libcell should replace an existing libcell. The system performs modeling for the new libcell to measure the improvement obtained by use of the new libcell. The system recommends the new libcell for addition to the library based on the performance modeling.

20 Claims, 16 Drawing Sheets

910

920

LIBRARY DESIGN AND CO-OPTIMIZATION WITH A CIRCUIT DESIGN

CROSS REFERENCE TO RELATED APPLICATIONS

This application claims the benefit under 35 U.S.C. § 119(e) of U.S. Provisional Patent Application Ser. No. 63/169,757, titled "Library Design and Co-optimization with a Circuit Design," filed Apr. 1, 2021 which is incorporated herein by reference in its entirety.

TECHNICAL FIELD

The present disclosure relates to an electronic design automation (EDA) system for a integrated circuit (IC) design in general. More specifically, the present disclosure relates to a system and method for providing library design and co-optimization to enhance a library of cells based on a circuit design.

BACKGROUND

The design automation flow of a circuit design is performed using a series of steps which sequentially refine the contents of the circuit design. The design automation process may start with an unmapped netlist, including generic logic gates and end up with a netlist implemented using cells from a cell library. Libraries used during the circuit design process include a predefined set of library cells that were selected for use across various circuit designs. Library cells of a library available for use in a circuit design may not be applicable to the circuit design. Use of a library with cells that are not usable to the circuit design results in an inefficient design process and results in a suboptimal implantation based on the circuit design.

SUMMARY

A system builds a library based on a circuit design. The system receives a library that includes a set of library cells. Each library cell represents a set of circuit components of circuit designs. The system receives a circuit design. The system determines a portion of the circuit design for use as an additional library cell. The system models the additional library cell to estimate one or more of an electrical property and a physical property for the additional library cell. The system recommends the additional library cell for addition to the library.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
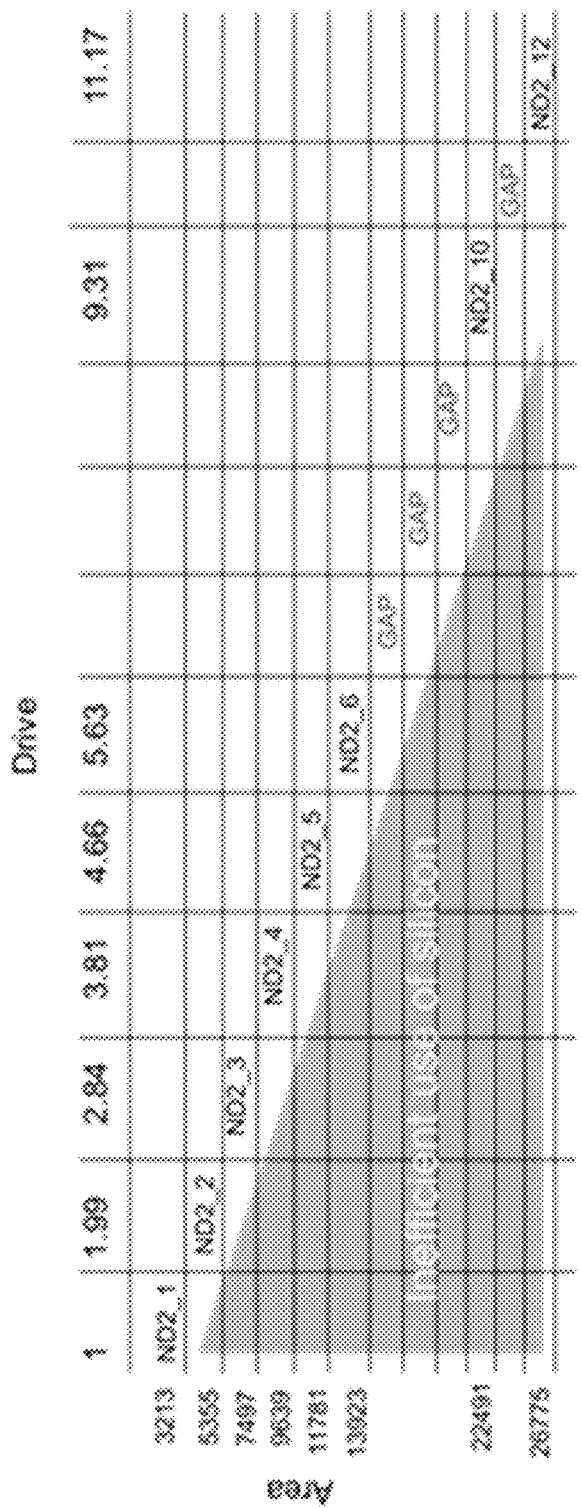
FIG. 1 illustrates gaps in libcell families that are used by the system for generating libcells according to an embodiment.

Aspects of the present disclosure relate to expanding an available library based on simultaneous optimization of a circuit design being built and the library cells being used. A library is a set of available technology library standard cells, (also known as libcells, cells, or library cells) from which a design is implemented. Logic synthesis and optimization use the libcells in the library to implement a design and optimize it for area, power, and delay. The optimization flow for logic synthesis and optimization includes a series of steps which sequentially refine the contents of the circuit design, starting with an unmapped netlist including generic logic gates and ending up with a netlist implemented using libcells from the library. During the design flow, various operations are performed including an initial mapping of the circuit design to a netlist, followed by early logic optimization, then initial placement, followed by optimization for design rule constraints and timing optimization, and then final placement and final optimization.

Libraries used during the circuit design process include a predefined set of library cells that were selected for use across various circuit designs. However, a circuit design may not be able to use the available library cells of the library. For example, the library cells relevant to a circuit design may not be available in the library. Alternatively, the library cells of the library may not be well optimized in the context in which the circuit design needs to use them. Use of properly designed library cells results in an improved circuit design in terms of properties such as area, delay, or power. If a circuit design is not able to use properly designed library cells, the design process generates a suboptimal circuit design and implementation.

The system according to various embodiments performs a library expansion that creates additional library cells during a circuit design's synthesis and optimization flow, resulting in improved timing, power or/and area for the design. The present process is referred to as library/design co-optimization (LDCO) herein because the system performs simultaneous optimization of both the circuit design being built and the set of available library components with which the design is being built.

According to an embodiment, the system performs library analysis by identifying gaps in libraries based on electrical properties. The system analyzes libcells of the library to determine whether an additional libcell should be added to the library. The system groups libcells of the library into families of components which are identical in function but differ in electrical properties, such as drive strength. The system identifies gaps in the library where additional libcells can be created. The system maps library cells of the library to ranges of values of an electrical property, for example, a drive strength. A gap represents a range of values of the electrical property for which the library is missing library cells. The system checks against the library to decide whether an additional cell should be added to the library. The system recommends a cell to be added to the library if the cell has electrical properties that are expected to fill a gap of the library.

According to an embodiment, the system performs library analysis by identifying weak libcells in the library using monotonicity plots. The system analyzes libcells of the library to determine whether an existing libcell should be replaced. The system identifies regions within families of libcells where the properties do not increase monotonically. The system identifies libcells that do not fit a monotonic profile for being selectively disabled. The system may check against the library to determine whether an existing cell should be replaced from the library.

According to an embodiment, the system determines values of an electrical property of library cells of the library. The system determines a representative value of the electrical property for the library, for example, an average across all library cells. The system determines a cell to be a weak cell or anomalous cell if the cell has a value of the electrical property that differs from the representative value of the electrical property of the library by more than a threshold value. The system marks the anomalous cells for replacement with additional library cells based on a circuit design. The system replaces the anomalous cells with additional library cells based on a circuit design.

According to an embodiment, the system performs unplaced logic function analysis of the circuit design to identify candidate libcells independent of the placement of the components. The system analyzes candidate libcells identified in a circuit design to rank them and identify the libcells that provide higher returns if implemented. The system generates a histogram of circuit patterns to measure their usage. The system compares circuit patterns against the library to select a subset. The system determines a strength of recommendation for each remaining pattern.

The system according to various embodiments performs the following types of analyses, including: (a) combinational unplaced function analysis, where the present system executes a process based on N-input lookup table to describe any combinational Boolean logic function with N-inputs for use as libcells; and (b) sequential unplaced function analysis, where the present system executes a process to search for additional sequential libcells to suggest in an IC design, regardless of the placement of the logic.

According to an embodiment, the system performs placed logic function analysis as follows. Given a placed design netlist, the system identifies structural patterns of mapped logic gates that may be combined into additional libcells. The system estimates the expected improvement in area, power, or delay by replacing the pattern of gates with an additional library cell. The system uses a structural match table to rank and identify the set of best patterns. Using the analysis, additional library cells are created in several forms.

According to an embodiment, the system performs electrical modeling of additional libcells. The system creates an electrical model for a libcell to predict electrical properties, for example, the area, power, and delay of an additional libcell. The system performs logic synthesis restructuring and mapping to generate a series of possible implementations for the additional libcell in terms of smaller primitive libcells. The system constructs a transistor circuit and optimizes it to reduce overall transistor count.

According to an embodiment, the system performs physical modeling of additional libcells. The system estimates a cell skeleton for the libcell using existing layout for smaller primitive libcells from the technology library. The cell skeleton represents the physical shape of the libcell that is sufficient for estimating the layout of the circuit design and may not include all the details of the libcell that are not necessary for determining the layout. For example, the cell skeleton may represent the libcell using a set pf poly grids as illustrated in FIG. 9. The system identifies libcells with matching skeletons for use and merges libcells to generate an additional libcell with improved skeleton.

This co-optimization improves the quality of the resulting design, resulting in better area, power, and performance when compared to another optimization method where the library is not modified. For example, for an example circuit design implemented in a 5-nanometer (nm) complementary metal oxide semiconductor (CMOS) technology library using a logic synthesis and optimization flow, the approach according to these embodiments delivered a 2% improvement in the worst negative slack for the design, a 6% improvement in total negative slack for the design, a 4% improvement in area for the design and a 5% estimated improvement for leakage power.

Here, slack refers to the difference between the required design timing performance on a path and the actual timing performance. If the slack is negative, the path is not as fast as desired. Reducing negative slack through timing optimization is necessary for the design to function at the desired speed.

The system periodically updates the library contents based on specific needs of the design for the specific optimization flow step(s) it is undergoing and can implement the additional libcells which are suggested. This involves: (1) analysis of the library and the requirements of the design in real-time; (2) suggestion of additional libcells for use in optimizing the design; (3) modeling to estimate the electrical and physical properties for the additional libcells which are suggested; and (4) implementation of the additional libcells in the design either as part of a current synthesis or as part of a targeted optimization.

The present system integrates these library update steps within the logic synthesis and optimization flow so that the library is optimized together with the design.

Following are the details of the (1) analysis process, which includes the suggestion of additional libcells for use in optimizing the IC design, (2) modeling techniques which estimate the electrical and physical properties of the suggested libcells, (3) the implementation of additional libcells in an IC design and 4) the integration of these steps into a synthesis and optimization flow.

The present system performs two types of analysis: (a) library analysis, which examines and improves upon the set of libcells in the library; and (b) design-driven analysis, which evaluates the design requirements and logic structure, and constructs suggestions for additional libcells based on that evaluation.

According to one embodiment, the present system performs library analysis by grouping libcells into families of components which are identical in function and which differ only in electrical properties, such as drive strength. The system gathers statistics on the performance of each libcell using a range of capacitive load values and input transition times, possibly over multiple process and temperature conditions, and then gathers statistics for each family.

The collection of libcells in each family is examined to locate gaps in drive strength. These gaps are cases where an additional libcell may be created in the library, to add libcells that fill the gaps in the drive strength(s) for that particular libcell family. This may include additional libcells created between a lower and upper drive strength libcell, or extrapolation beyond the first or last libcell in a family, to create additional drive strength version(s).

FIG. 1 illustrates gaps in libcell families that are used by the system for generating libcells according to an embodiment. The system obtains drive strengths of library cells. The drive strength of a library cell represents its output conductance, which, in turn, is a measure of the size of the negative (N) and positive (P) transistors: larger transistors result in shorter switching times. Because of fabrication constraints, the transistor sizes are quantized, that is, multiples of the minimum possible transistor size. For example, in FIG. 1, the transistors of ND2_2 are twice the size of those of ND2_1, and correspondingly the library cell is twice as fast.

FIG. 1 illustrates a family of NAND2 logic functions with a range of drive strengths given by _drive, for example, ND2_1 is a NAND2 logic function with a drive strength of 1, ND2_2 is a NAND2 logic function with a drive strength of 2, and so on. The system performs quantization along the area and delay axes to allows for a pattern of monotonic increases to be derived. From the quantized data, the system identifies gaps representing data values or ranges in the data where the smooth progression between logic circuit family members is missing. In the diagram above there are four gaps (marked as GAPs), for the ND2_7, ND2_8, ND2_9, and ND2_11 libcells which could be created.

The drive strength S of a library cell may not be directly available from the library vendor. Similarly, transistor sizes also may not be available from the vendors. The system may obtain the available information, i.e., the delay table, which gives the delay D of the output in response to an input change, for different values of the load capacitance C. The delay D is roughly linearly dependent on C, i.e., $D=C/S$.

The system obtains the absolute value of S by a least-squares regression on the delays in the delay table. The system compares the value of S with the value of a minimum-sized inverter to obtain the relative drive strength of that library cell.

In addition to gaps between existing libcells, the system also identifies regions within families of libcells where their properties do not smoothly increase. Such cases are non-monotonic libcells.

Figure 2:
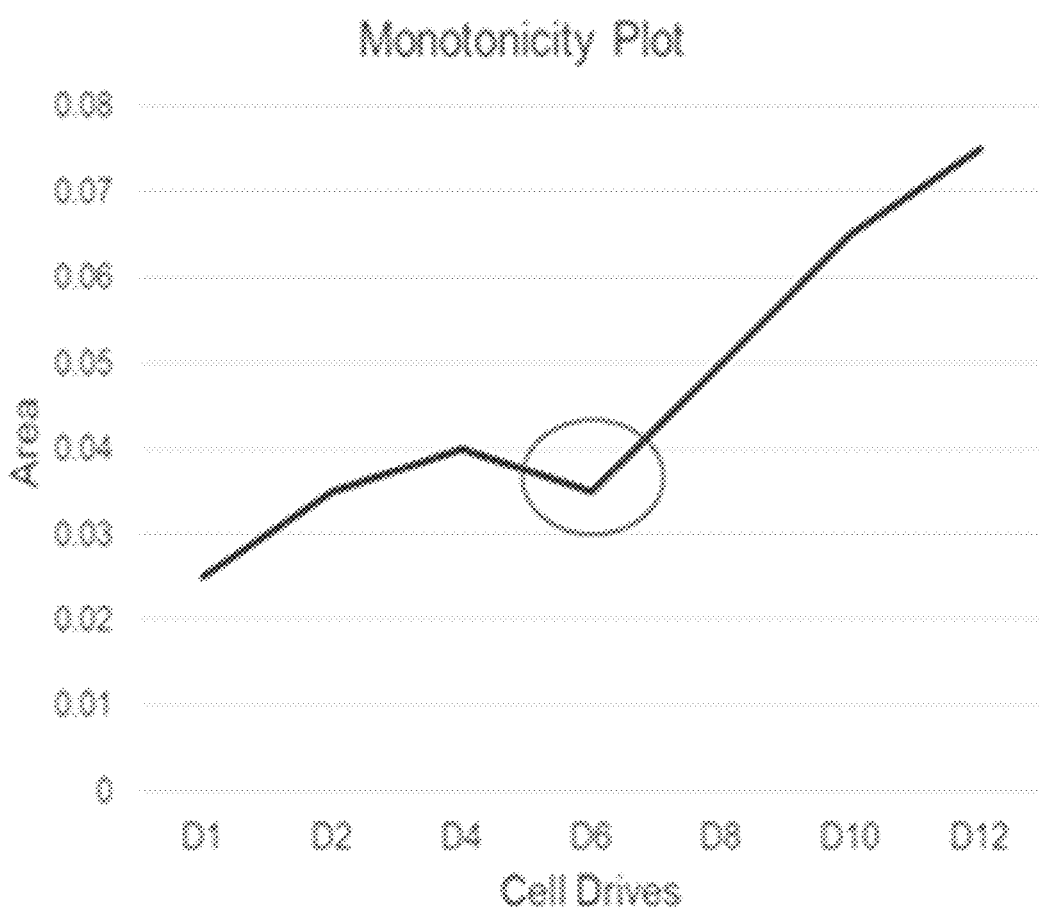
FIG. 2 illustrates non-monotonicity in a libcell family that is used by the system for generating libcells according to an embodiment.

FIG. 2 illustrates non-monotonicity in a libcell family that are used by the system for generating libcells according to an embodiment. In the circled case, the D6 libcell does not smoothly increase in area as compared to the D4 and D8 libcell. The system identifies these cases, and selectively disables libcells which do not fit a monotonic profile. In the case, for example, of drive strength, there is an expected linear correlation of drive strength to area. Any library cell with a drive strength below a linear interpolation of the next library cells (with lower and upper area, respectively) is flagged as an anomaly. Excluding anomalous libcells from optimization helps to improve the quality of optimized results.

According to one embodiment, the present system performs design-driven analysis by evaluating the design requirements and logic structure, and constructs suggestions for additional libcells based on that evaluation. The input to the process is a netlist for a design, including instances for the design logic. The following techniques are used for analysis. According to an embodiment, the system performs unplaced logic function analysis. The system suggests logic functions which can be used for mapping the given design logic, independent of any placement that might exist for the logic. There are two methods described: one for combinational logic, and one for sequential logic.

According to an embodiment, the system performs combinational unplaced function analysis. The process described below makes use of an N-input lookup table, which describes any combinational Boolean logic function with N-inputs.

Figure 3:
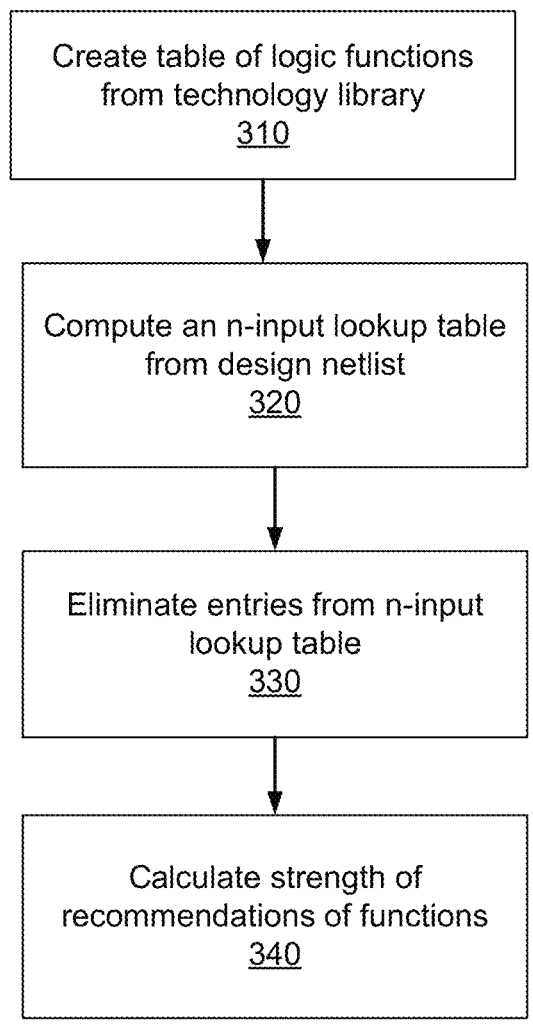
FIG. 3 shows a process for combinational unplaced function analysis according to an embodiment.

FIG. 3 shows a process for combinational unplaced function analysis according to an embodiment.

The system accesses a technology library and creates a hash table storing canonical representations of all the logic functions in the technology library at 310. The use of canonical representation ensures that gates that have equivalent logic function have the same hash value independent of the way they are represented. The technology library specifies available libcells.

At 320, the system receives a design netlist and iteratively computes an N-input lookup table, where N=3, N=4, . . . N=K. The N-input lookup table may not include 2 input gates that are likely to be conventional gates. The N-input lookup table stores information describing the logic functions found in the design netlist for each value of N into a hash table. The system may limit the depth of the circuit pattern being matched to a threshold depth to improve the computational efficiency of the process.

At 330, the system consolidates the lookup table by eliminating certain entries. For example, the system removes any entries in the table from 320 which are defined in the table from 310 since these libcells already exist and the goal of the system is to recommend additional libcells. The system may estimate performance of certain functions corresponding to the circuit patterns and eliminate functions that are determined to generate low quality libcells. For example, the system may estimate metrics of the circuit pattern including delay, area, power, and so on and eliminate circuit patterns that have worse than a threshold performance for each estimated metric. Accordingly, the system eliminates or recommends for modification any resulting functions which would not result in high quality library cells.

At 340, the system calculates a measure of strength of recommendation for each of the remaining functions of the lookup table. The strength of recommendation is a combination of factors including (1) a frequency of occurrence, i.e., a number of times the function occurs in the lookup table computed at 320 compared to other functions, and (2) a measure of the potential benefit of an additional function library cell (e.g., an improvement in area/delay/power) as compared to network(s) of existing library cells which implement the same logic function. Regarding (1), a high occurrence count predicts more frequent usage of the additional function in a given design. Regarding (2), a large improvement in area/delay/power for a cell implementing the additional function as compared to netlist(s) of existing library cells indicates the potential benefit the additional function library cell could bring. The system combines values representing (1) and (2) to compute a recommendation strength for the additional function. The system determines that stronger recommendations are more likely to be useful when mapping the design.

The system may proceed into the modeling and implementation phase for the resulting collection of logic function suggestions.

The analysis done here can be performed on a design with or without placed netlist instances. The result does not depend on placement. Therefore, the analysis is referred to as unplaced. This allows the additional function identification to combine logic freely based on connectivity and not physical proximity.

According to an embodiment, the present system performs sequential unplaced function analysis which may be similar to the combinational unplaced analysis described above. The present system searches for additional sequential libcells to suggest in a design, regardless of the placement of the logic.

Figure 4:
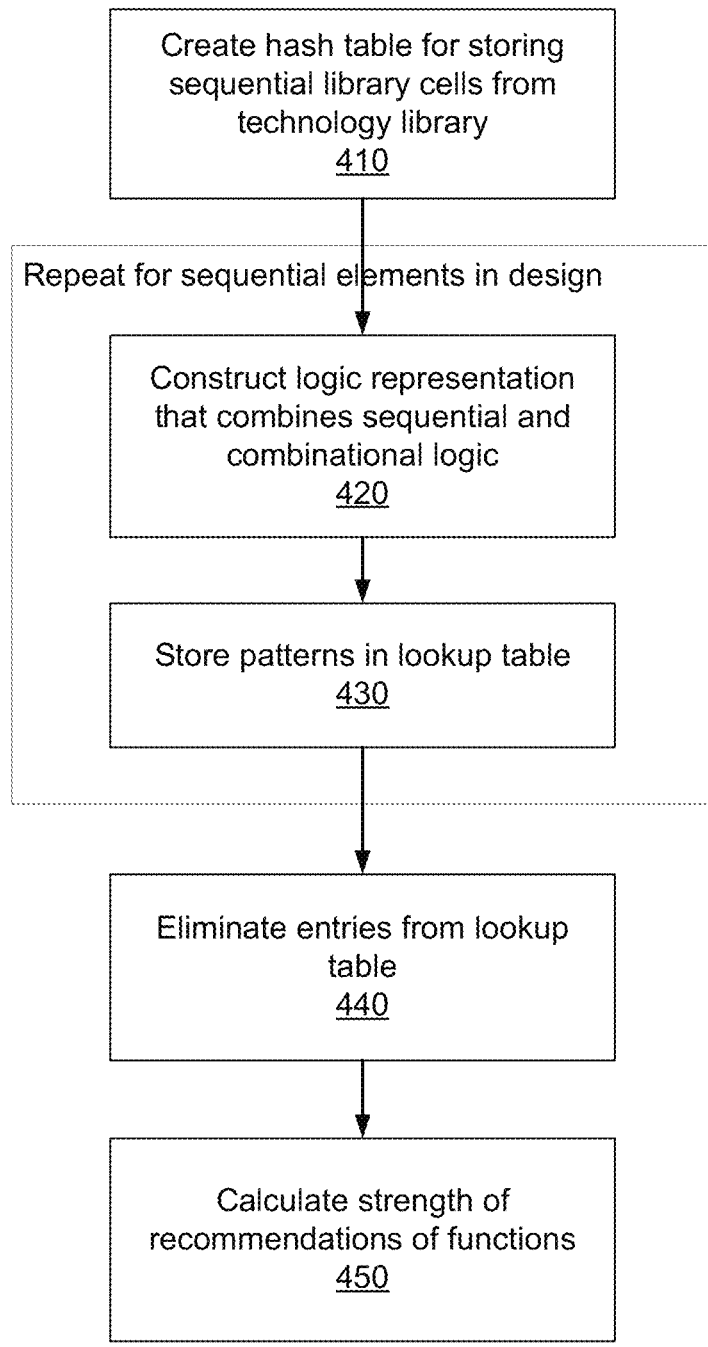
FIG. 4 shows a process for sequential unplaced function analysis according to an embodiment.

FIG. 4 shows a process for sequential unplaced function analysis according to an embodiment. The system extends the canonical representation of logic functions to include sequential functionality by using a sequential state equation in combination with the logic equation. The canonical sequential equation describes the next state of a register or latch in terms of the current inputs and the previous state of the device. At 410, the system creates a hash table which stores this canonical representation for all sequential library cells in the user's technology library.

For each of the sequential elements in the design, the system repeats the following steps 420 and 430 for each sequential element. At 420, the system constructs a series of logic representations which combine the sequential function of the register/latch with the combinational logic at the inputs and outputs of the register/latch. This aggregation of logic around the sequential function is limited to a fixed depth and limited so that no logic signal within the matched pattern is used outside the pattern. In other words, the pattern contains no external use of internal fanouts. At 430, the system stores each pattern in a lookup table, for example, a hash table similar to the structure used for combinational unplaced analysis. Each hash table entry is a pattern, and a measure of the number of times the pattern has been identified.

At 440, the system eliminates certain entries from the lookup table. For example, the system removes any entries in the table from 430 which are defined in the table from 410. This helps the system to eliminate or modify any resulting functions which are not expected to result in high quality CMOS library cells. At 450, the system calculates a measure of strength of recommendation for each of the remaining functions, which is relative to the number of times the function occurs in the table from 430. Stronger recommendations are more likely to be useful when mapping the design.

According to an embodiment, the present system suggests additional logic library cells (either combinational or sequential) which would be beneficial for mapping the given design logic, taking the placement of existing logic instances into account. This approach searches for nearby gates that can be combined into an additional libcell to improve delay, area, and power.

Figure 5:
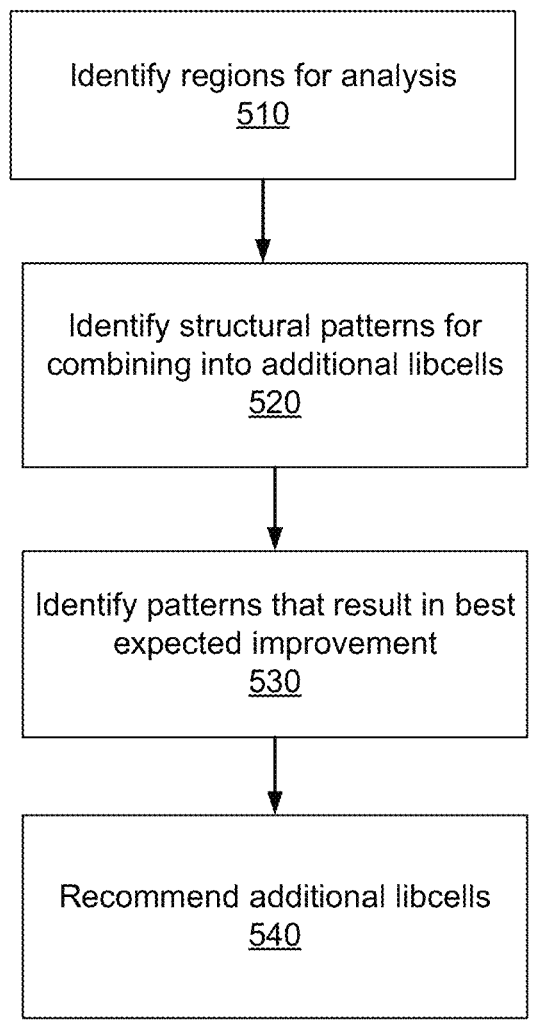
FIG. 5 shows a process for placed logic function analysis according to an embodiment.

FIG. 5 shows a process for placed logic function analysis according to an embodiment. Given a placed design netlist, at 510, the system identifies the region(s) on which the analysis and implementation phases will be run. The system may optimize different parameters such as area, power, delay, and so on. If the system aims to recover area or power, then the system identifies combinational logic as the regions. If the system aims to improve delay, then the system identifies paths whose timing goals are not met, starting with the most critical (i.e., the paths with the largest difference between the required and arrival times) and builds the regions based on the identified paths.

Using a levelized traversal of the network (or, optionally, breadth or depth-first search), at 520, the system identifies structural patterns of mapped logic gates that may combined into additional libcells. These patterns may overlap one another. The system stores each occurrence of a pattern in a hash table that records the structure of the logic found. As each pattern is identified, the system estimates the expected improvement in area, power, or delay which could come from replacing the pattern of gates with an additional library cell. The estimate for the timing, area, and power of the additional library cell is called a model. The process of generating a model is described herein. The difference between the area, power and delay of the model and the pattern of gates existing in the design is the expected improvement of this pattern. The system inserts the pattern and the expected improvement into a structural match table, which accumulates the improvement values for each unique pattern, and captures the overlap relationship between patterns.

At 530, the system uses the table to identify the set of M non-overlapping patterns that produce the best expected improvement in aggregate. The limitation M is the maximum number of additional library cells which can be constructed. M is introduced as a constraint because there is an overhead of introducing an additional libcell. This is so because there is additional process involved in creating the libcell. This places a limit on the total number of additional libcells which can be suggested.

Figure 6A:
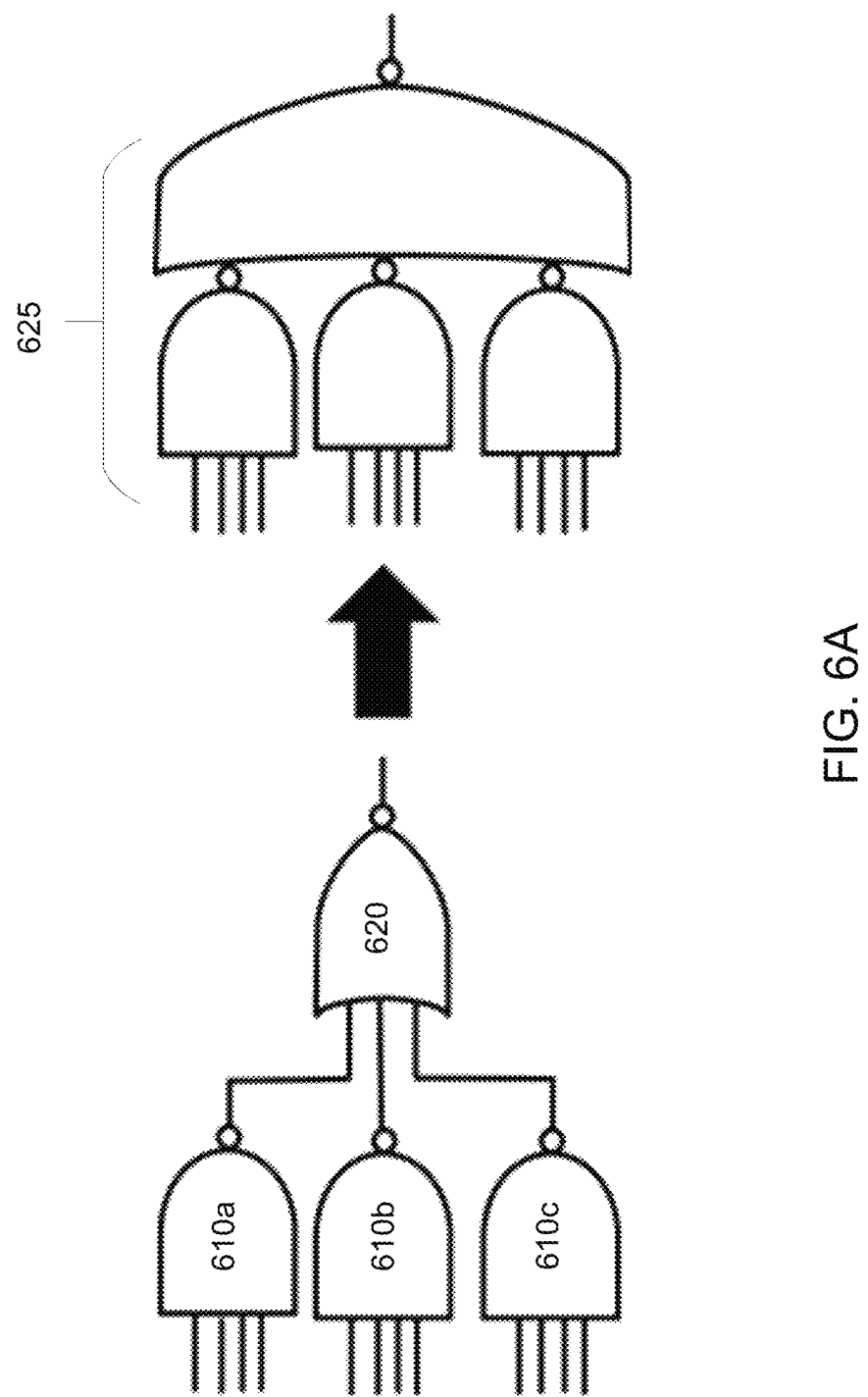
FIG. 6A illustrates a single bit combinational libcell created from smaller libcells.
Figure 6B:
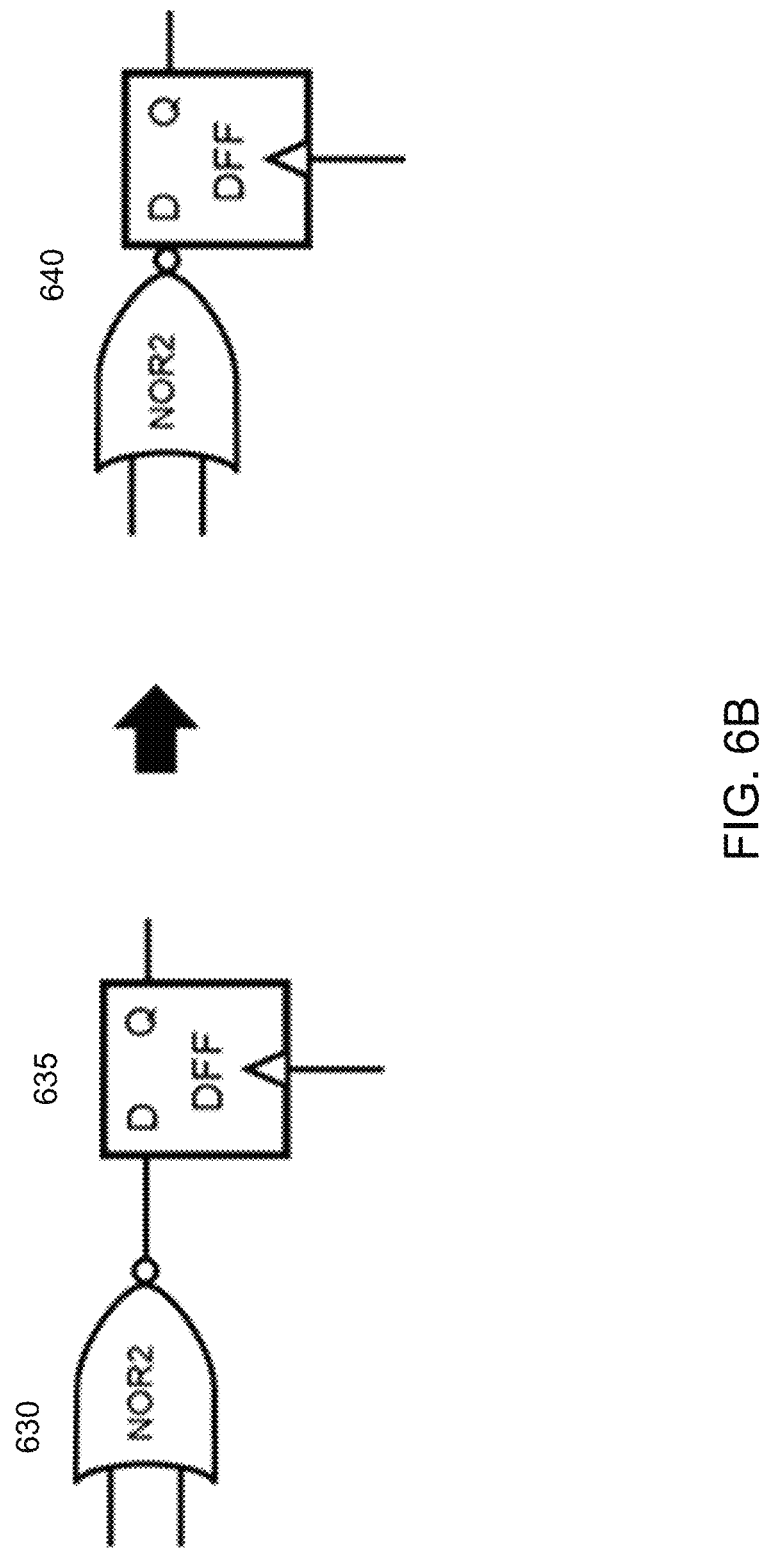
FIG. 6B illustrates a sequential fused flip flop created by combining a combinational gate with an existing flip flop.
Figure 6C:
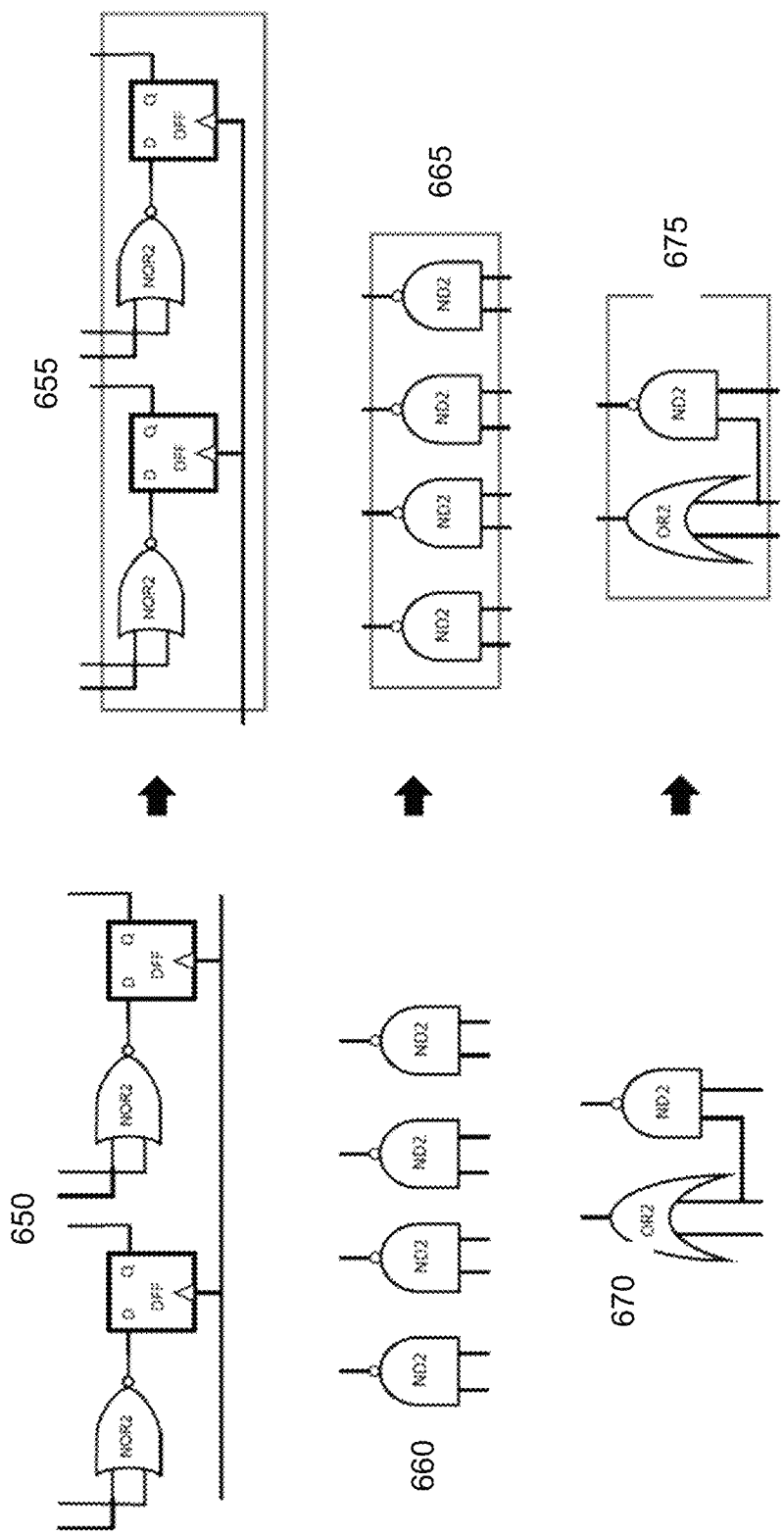
FIG. 6C illustrates a multibit fused flip flop created by combining multiple existing flip flops and combinational gates.

At 540, the system recommends or create additional library cells in several forms from placed combinational and sequential gates in the network. FIGS. 6A-C illustrate example libcells that may be created using the techniques disclosed.

FIG. 6A illustrates a single bit combinational libcell created from smaller libcells. For example, FIG. 6A shows a circuit including nand gates 610a, 610b, and 610c that provide input to a nor gate 620. The circuit can be replaced with an optimized combinational libcell 625. FIG. 6B illustrates a sequential fused flip flop 640 created by combining a combinational gate 630 with an existing flip flop 635. FIG. 6C illustrates a multibit fused flip flop 655 created by combining multiple existing flip flops and combinational gates as shown in circuit 650. FIG. 6C also shows two multibit combinational libcells 665 and 675 created by combining multiple existing single bit combinational libcells shown in circuit 660 and 670 respectively. The inputs of the multibit libcell may or may not be disjoint. For example, a multibit register may have common clock, set, and reset signals, or not. Similarly, combinational multibit libcells may share input logic signals, or they may have completely disjoint signals.

The system performs modeling of the libcells to predict the area, power and delay of additional libcell suggestions. This allows the system to estimate the potential benefit of the additional libcells in the context of an actual design. Modeling involves an electrical and physical aspect.

Figure 7:
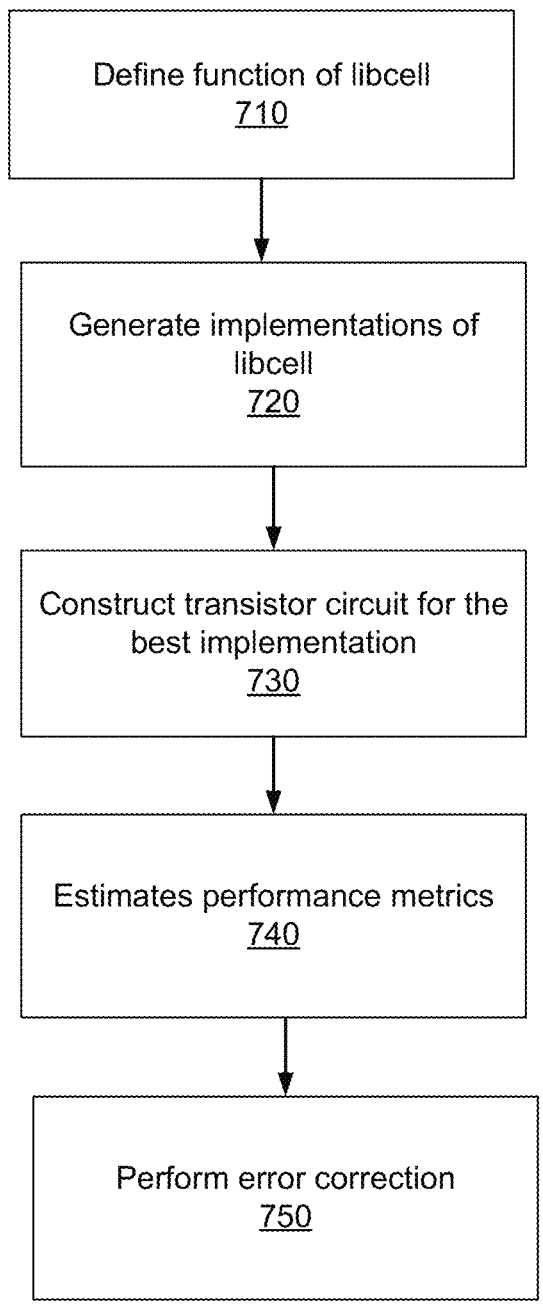
FIG. 7 illustrates a process for electrical modeling for additional libcells according to an embodiment.
Figure 8:
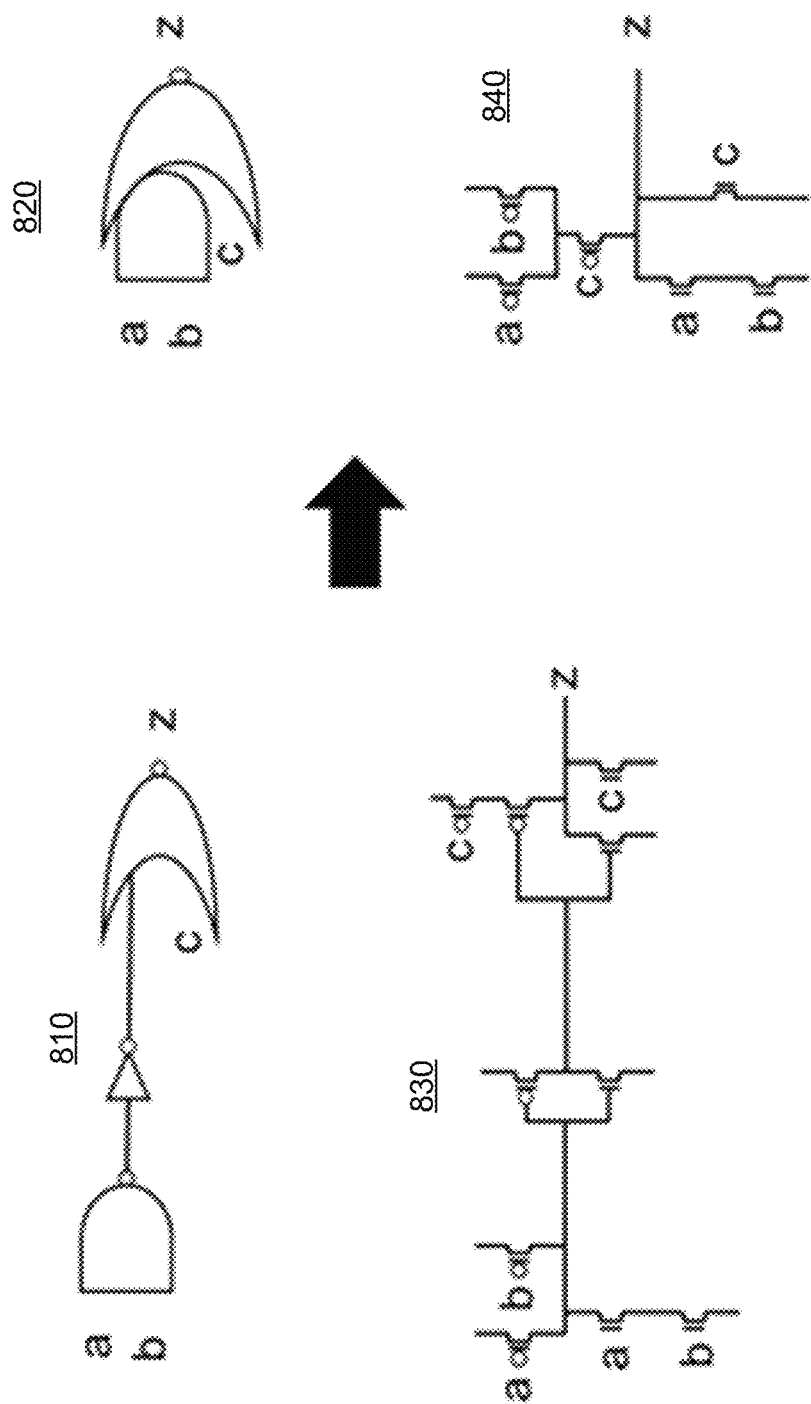
FIG. 8 illustrates modeling transistor savings for additional libcells according to an embodiment.

FIG. 7 illustrates a process for electrical modeling for additional libcells according to an embodiment. At 710, the system defines the logic function of the additional libcell. According to an embodiment, the system determines a netlist of components that will be replaced by the additional libcell to define the function of the libcell. At 720, the system generates a series of possible implementations for the additional libcell in terms of smaller primitive libcells (like 2-input NAND, 2-input NOR, 2-input OR, and 2-input AND, and inverters). The system uses logic synthesis restructuring and mapping to generate the implementations. The system ranks the implementations based on metrics such as area, power and delay. At 730, the system constructs a transistor circuit for the best solutions determined during step 720. This allows the system to potentially identify mappings which reduce the overall transistor count for the design. For example, FIG. 8 shows how the CMOS transistor count can be reduced for circuit 810 to generate the combined logic gates 820. Similarly, the transistor count can be reduced for the transistor circuit 830 to obtain the transistor circuit 840. Referring to FIG. 7, at 740, the system estimates metrics such as delay, area, and power based on the netlist and the transistor model derived in steps 720 and 730, respectively. In some embodiments, at 750, the system performs error correction on the results to improve the results. For example, the system may perform multi-objective error minimization based on analysis done on the primitive libcells in the library.

Figure 9A:
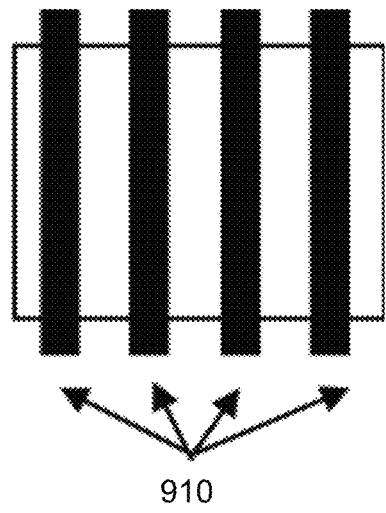
FIG. 9A illustrates polysilicon stripes according to an embodiment.
Figure 9B:
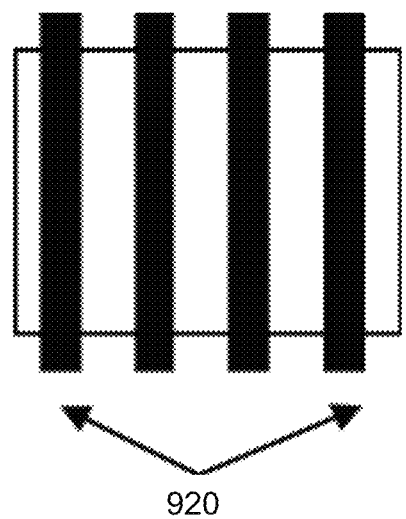
FIG. 9B illustrates dummy poly gates according to an embodiment.
Figure 9C:
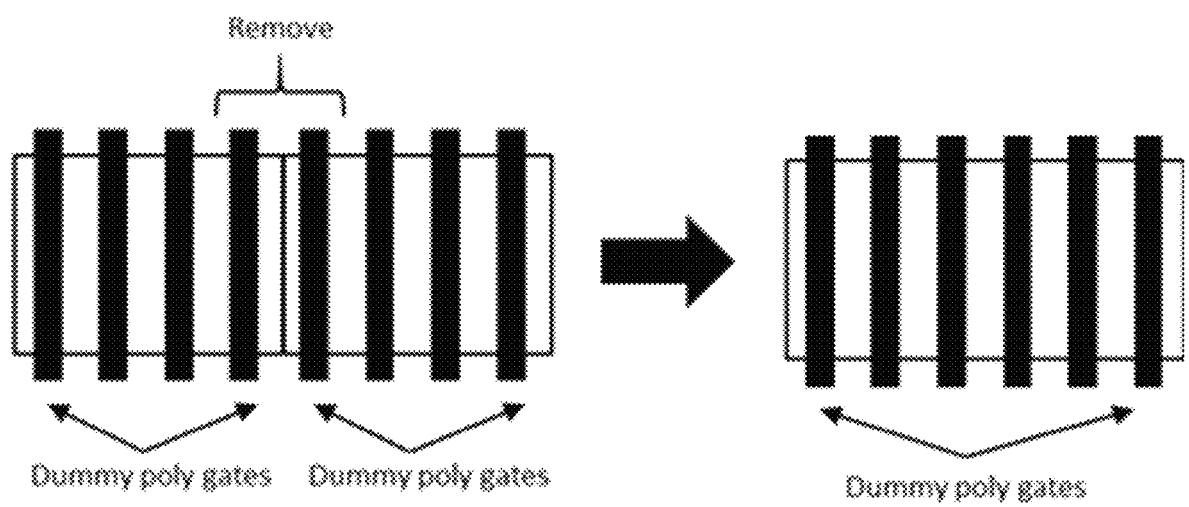
FIG. 9C illustrates composing a larger cell from two existing cells according to an embodiment.

Deep submicron technology nodes have many detailed physical restrictions to handle lithography-caused inaccuracies. Instead of just a single layer per pattern, there can be multiple patterns. To accommodate a complicated multi-pattern physical layout, optimal physical design of a cell requires many physical variants with the same function. This is referred as color aware multi-pattern physical design. An experienced layout engineer may be able to perform a more optimized place and route compared to traditional transistor level place and route techniques. According to an embodiment, instead of creating a transistor level place and route for the cell skeleton generation, the system estimates the skeleton using existing layout for smaller primitive libcells from the technology library. In a deep submicron (7 nm and below) library, a cell skeleton size is usually dominated by number of polysilicon grids. These poly stripes are uniformly distributed throughout the whole cell:

FIG. 9A illustrates polysilicon stripes 910. In library cell designs, two extra dummy stripes 920 are used for the diffusion break, one near the left boundary and the other near the right boundary. FIG. 9B illustrates dummy poly gates. When two cells are abutted, two poly grids can be removed. FIG. 9C illustrates composing a larger cell from two existing cells. This allows the libcell shape to be simplified. The following process is used to estimate the skeleton, including the pin locations for the additional estimated library cell. The flowchart, is given as input a library of primitive libcells that already exists for the technology, an implementation of the additional libcell function in terms of discrete primitive libcells from that library, and a 'target' libcell from the primitive library which has similar properties to the desired additional libcell.

Figure 10:
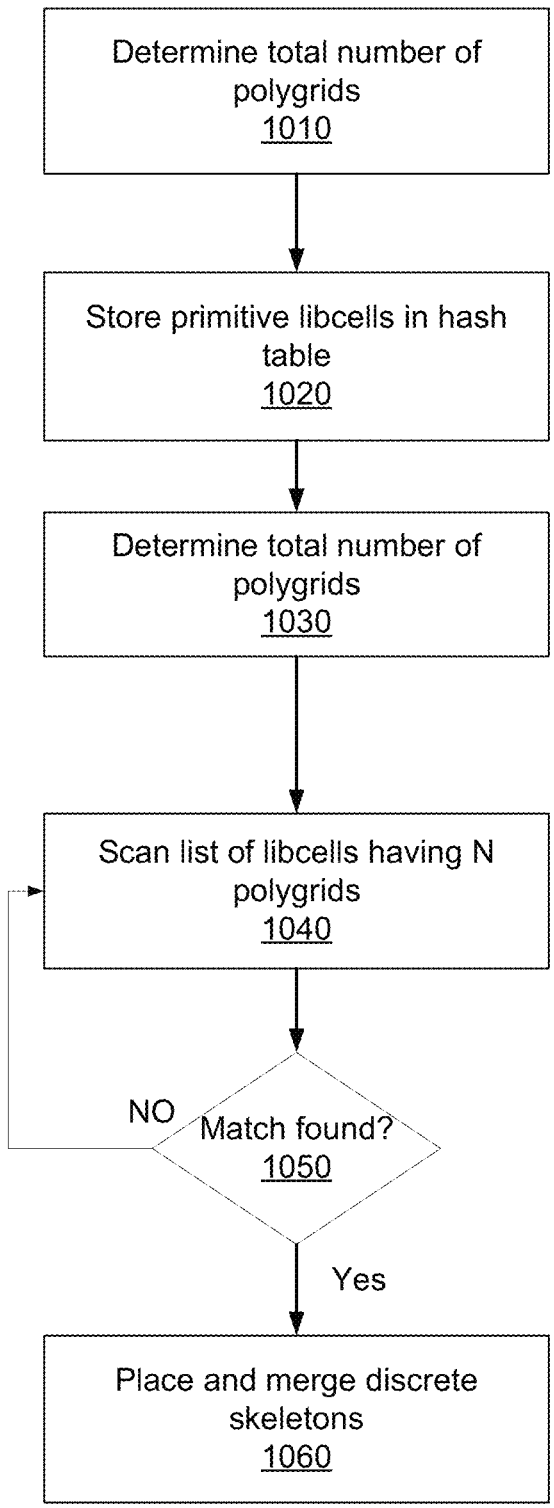
FIG. 10 illustrates a process for physical model creation for additional libcells according to an embodiment.

FIG. 10 illustrates a process for physical model creation for additional libcells according to an embodiment. For each primitive libcell, at 1010, the system determines the total number of poly grids. If a poly grid spans more than one row, the system multiplies the number of poly grids by the number of rows that the libcell occupies. At 1020, the system creates a hash table "T" and stores all primitive libcells in the hash table, hashed by the number of poly grids which they contain. Given a discrete implementation of a function in terms of primitive libcells, at 1030, the skeleton estimator determines the total number of poly grids P as described earlier. At 1040, the system obtains the list of libcells having P poly grids from table T and scans the list for the libcells that have the same number of inputs and output pins as the additional libcell. If a primitive libcell matching the number of inputs and outputs is found, the skeleton of that libcell is used as the skeleton for the additional cell. If a matching libcell is not found at 1050, the estimator finds the skeleton of a libcell whose poly grid count is closest and repeats 1040 until the discrete implementation satisfies the poly grid number requirement. At 1060, the system places and merges 1060 the discrete skeletons. The pin locations for the additional libcell use the discrete skeleton cells' pin locations with the appropriate coordinate shifts.

If the target libcell spans more than two rows, steps 1040 and 1050 are modified as follows. The step 1040 is modified such that the closest multiple height libcell is scanned from the list given from T. If the closest multiple height libcell cannot be found, the system scans the list with one grid smaller, and so on, until one is obtained. The step 1050 is modified such that the remainder grid number is divided by the number of rows, and then table T is searched with that grid number. If the resulting grid number is zero, the system repeats from step 1040. Otherwise step 1050 is repeated until a solution is found.

The discrete skeletons are placed so that the first skeleton always has the required multiple row height, and the rest are sets of equal-sized height skeletons.

Figure 11A:
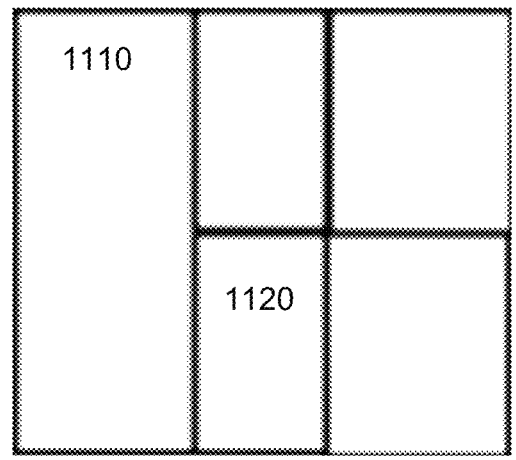
FIG. 11A illustrates placement of multiple row height skeletons.
Figure 11B:
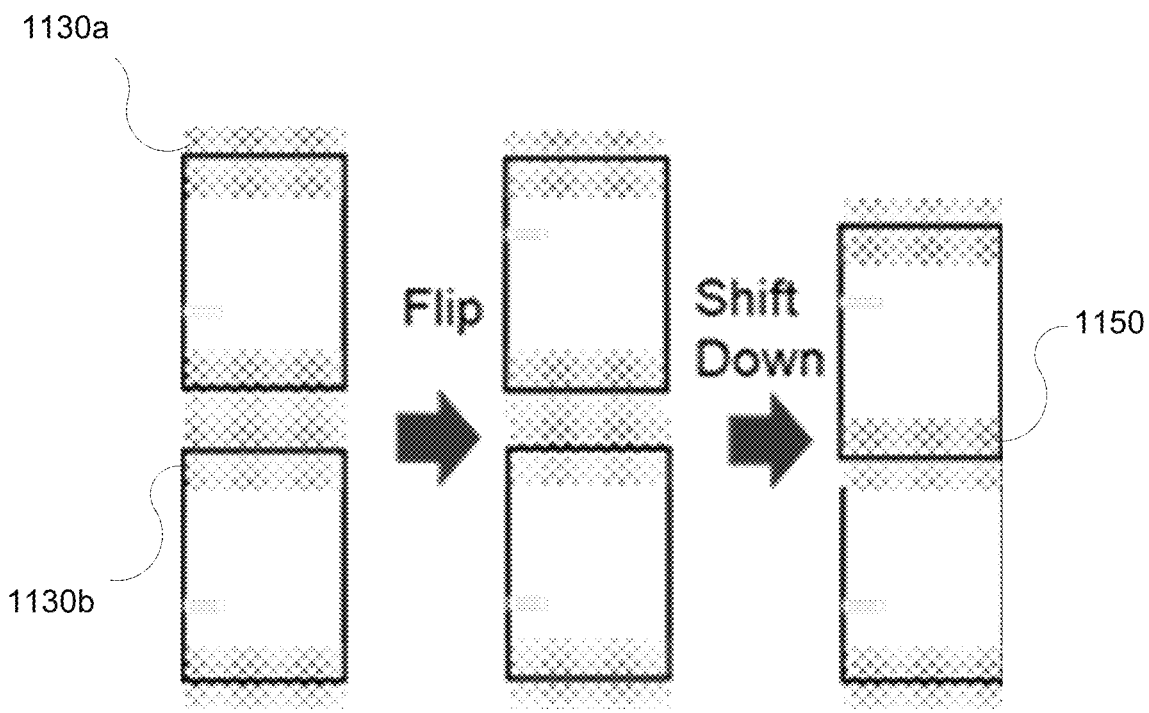
FIG. 11B illustrates sharing power and ground strips for vertical stacking.

FIG. 11A illustrates placement of multiple row height skeletons. For example, skeleton 1110 has different height compared to skeleton 1120. The merging of left and right adjacent libcells uses the same process as shown in FIG. 10. The vertical stacking of libcells also requires that power and ground strips are shared. FIG. 11B is an example of vertical stacking of identical skeletons and the sharing of power and ground strips. FIG. 11B illustrates sharing of power and ground strips for vertical stacking. For example, power strips 1130a and 1130b are shared in the stacked cells that uses the shared power strip 1150. Similarly ground strips may be shared.

The additional libcells that are suggested during the analysis steps, and modeled as described above can then be considered for implementation in the design. There are two methods for implementation which are described below.

Additional libcells which were derived from the unplaced design are given to the logic synthesis optimization flow in a technology library which is used alongside the existing technology library for design optimization. These additional libcells are used by the logic synthesis and optimization flow exactly as ordinary libcells that are not generated from the circuit design are used; the mapping and optimization engines are free to use them as needed in the design. That the is the benefit of this method: it makes the additional libcells available for the entire optimization process.

Additional libcells which were derived from the placed design are implemented during a costed optimization process that occurs immediately after the analysis step. The result of design-driven analysis is a table containing the additional libcell opportunities which were found and their potential savings for the design. Users can direct this analysis step to implement the 'N best' additional libcell opportunities found during analysis, since the opportunities are ranked by potential benefit. This implementation is done in a costed optimization transform, which will insert the additional libcell instances if they improve the design in terms of timing and/or area and/or power.

Both implementation methods are inserted directly into the logic synthesis and optimization design flow, as described below.

Figure 12:
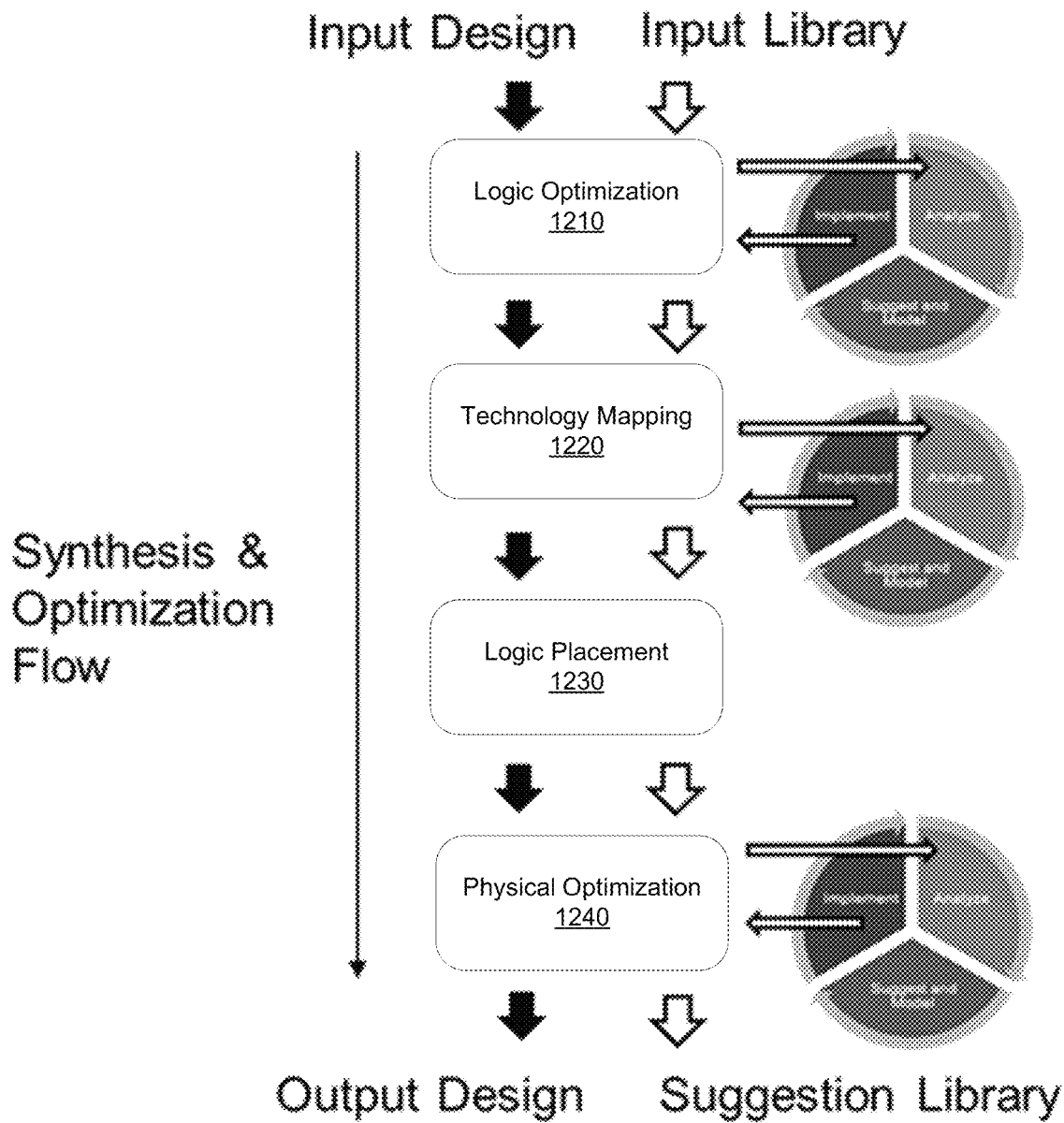
FIG. 12 illustrates library/design co-optimization integration.

FIG. 12 illustrates a library/design co-optimization integration process, which starts with a user's design and the technology library into which the design will be implemented.

Library analysis is performed after the logic optimization stage 1210. Unplaced design-driven analysis is performed just before the initial technology mapping 1220 occurs in the synthesis and optimization flow.

Additional library cells suggested and modeled from 1210 and 1220 are made available starting at the initial mapping of the design from generic logic into technology libcells. Their availability continues throughout the optimization flow. Any library cells which are disabled (for example, because they are non-monotonically increasing in some property) are removed from use by the logic synthesis tool at this point.

Placed design-driven analysis and implementation is done after the logic placement step 1230 for the design, and selectively during various portions of the physical optimization phase 1240. For example, additional multi-bit libcells are suggested prior to multibit libcell mapping and sizing steps. Additional combinational libcells are suggested during timing optimization, once the critical portions of the design are well-defined and being incrementally refined, and they are also suggested prior to area and power recovery steps. Additional sequential fused libcells are suggested similarly, during timing optimization, and during area and power recovery steps.

The results are an optimized design and a suggestion library of estimated additional library cells that were created, modeled, and implemented during the design optimization process. The additional libcells in the suggestion library are then given to a library design team for implementation in silicon and characterization. The above process of library/design co-optimization improves design quality as compared to only optimizing the design.

Figure 13:
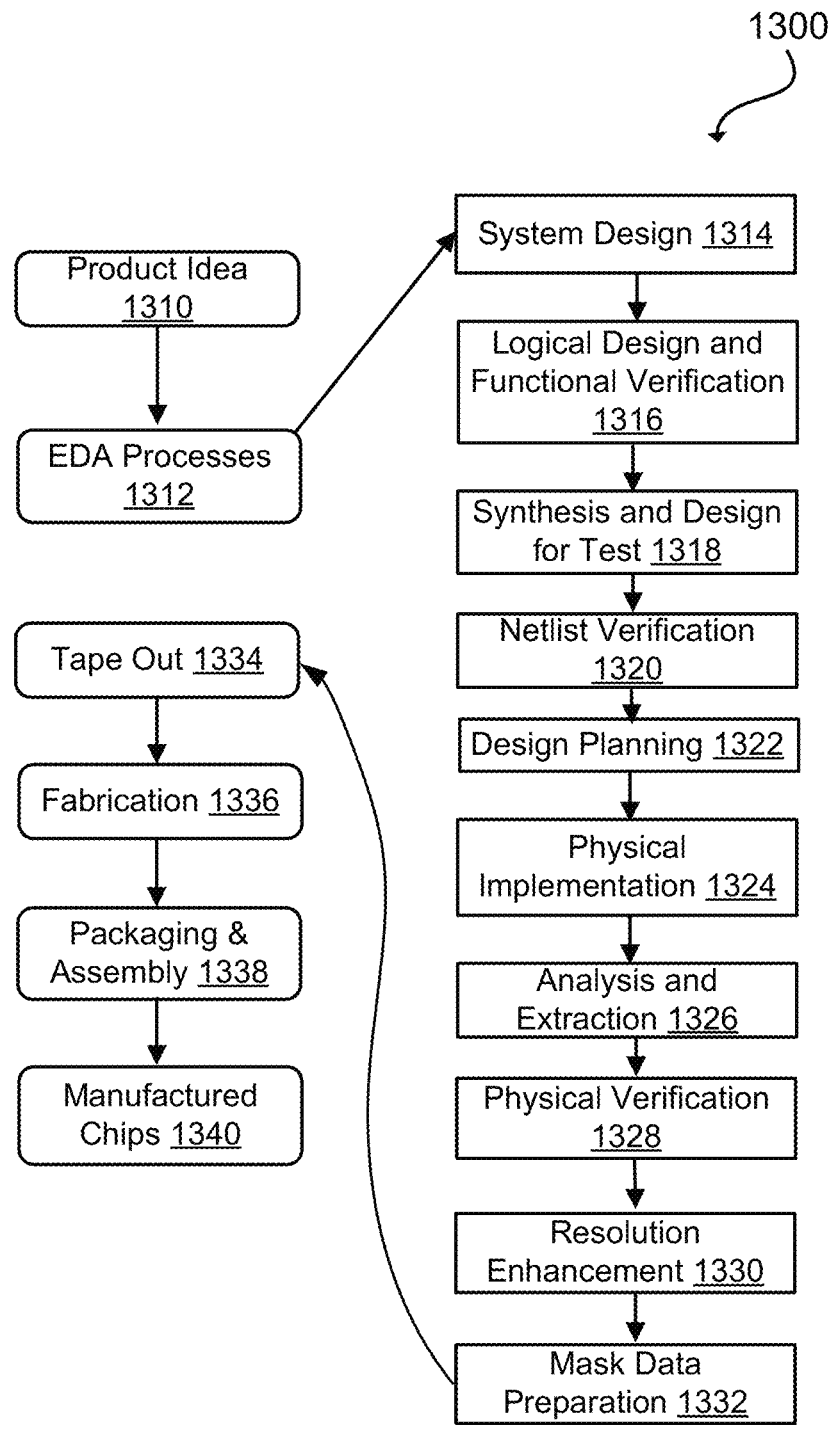
FIG. 13 depicts a flowchart of various processes used during the design and manufacture of an integrated circuit in accordance with some embodiments of the present disclosure.

FIG. 13 illustrates an example set of processes 1300 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1310 with information supplied by a designer, information which is transformed to create an article of manufacture that uses a set of EDA processes 1312. When the design is finalized, the design is taped-out 1334, which is when artwork (e.g., geometric patterns) for the integrated circuit is sent to a fabrication facility to manufacture the mask set, which is then used to manufacture the integrated circuit. After tape-out, a semiconductor die is fabricated 1336 and packaging and assembly processes 1338 are performed to produce the finished integrated circuit 1340.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 13. The processes described by be enabled by EDA products (or tools).

During system design 1314, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1316, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1318, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1320, the netlist is checked for compliance with timing constraints and for correspondence with the HDL code. During design planning 1322, an overall floor plan for the integrated circuit is constructed and analyzed for timing and top-level routing.

During layout or physical implementation 1324, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1326, the circuit function is verified at the layout level, which permits refinement of the layout design. During physical verification 1328, the layout design is checked to ensure that manufacturing constraints are correct, such as DRC constraints, electrical constraints, lithographic constraints, and that circuitry function matches the HDL design specification. During resolution enhancement 1330, the geometry of the layout is transformed to improve how the circuit design is manufactured.

During tape-out, data is created to be used (after lithographic enhancements are applied if appropriate) for production of lithography masks. During mask data preparation 1332, the 'tape-out' data is used to produce lithography masks that are used to produce finished integrated circuits.

A storage subsystem of a computer system may be used to store the programs and data structures that are used by some or all of the EDA products described herein, and products used for development of cells for the library and for physical and logical design that use the library.

Figure 14:
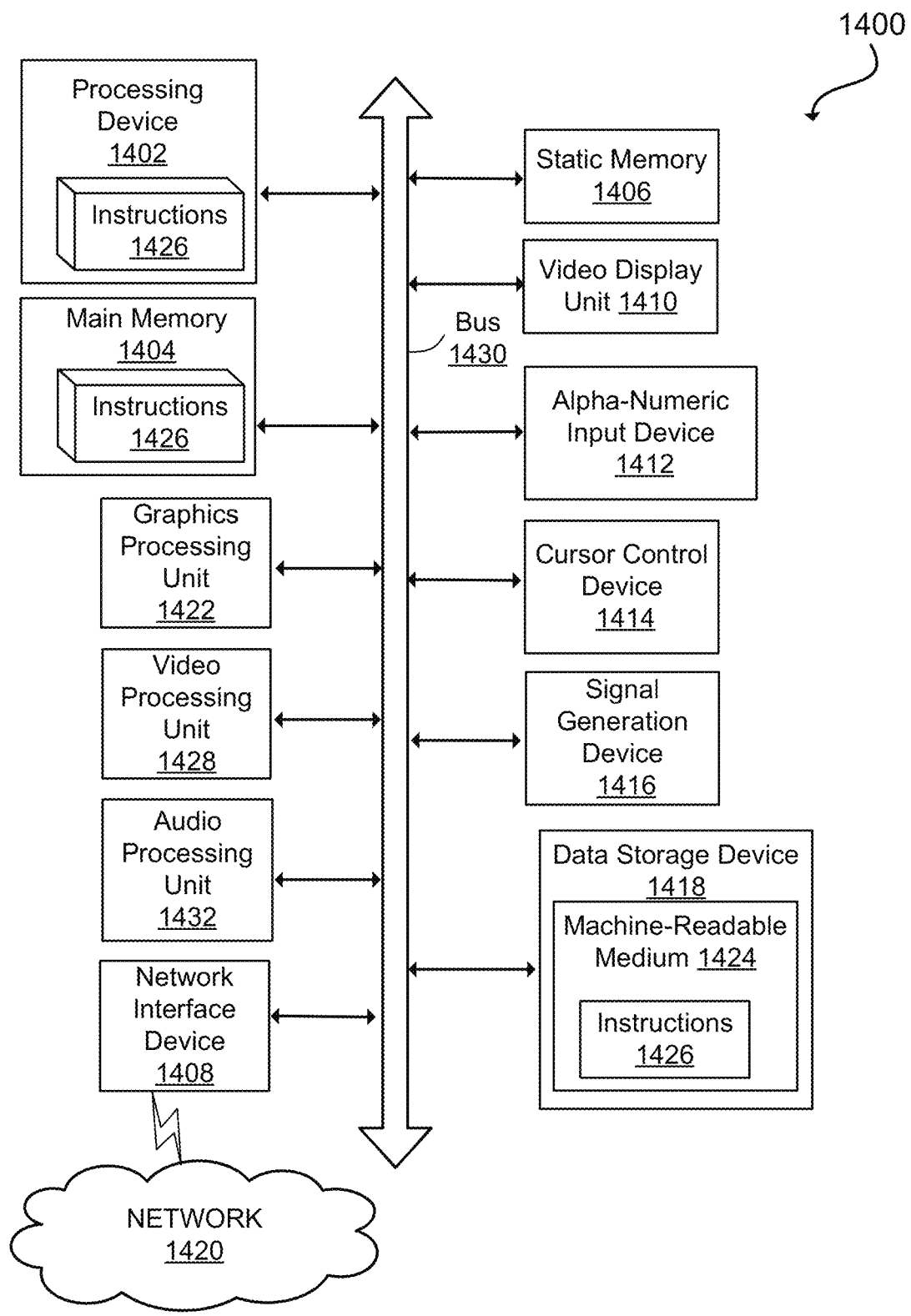
FIG. 14 depicts a diagram of an example computer system in which embodiments of the present disclosure may operate.

FIG. 14 illustrates an example machine of a computer system 1400 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1400 includes a processing device 1402, a main memory 1404 (e.g., read-only memory (ROM), flash memory, dynamic random access memory (DRAM) such as synchronous DRAM (SDRAM), a static memory 1406 (e.g., flash memory, static random access memory (SRAM), etc.), and a data storage device 1418, which communicate with each other via a bus 1430.

Processing device 1402 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1402 may also be one or more special-purpose processing devices such as an application specific integrated circuit (ASIC), a field programmable gate array (FPGA), a digital signal processor (DSP), network processor, or the like. The processing device 1402 may be configured to execute instructions 1426 for performing the operations and steps described herein.

The computer system 1400 may further include a network interface device 1408 to communicate over the network 1420. The computer system 1400 also may include a video display unit 1410 (e.g., a liquid crystal display (LCD) or a cathode ray tube (CRT)), an alphanumeric input device 1412 (e.g., a keyboard), a cursor control device 1414 (e.g., a mouse), a graphics processing unit 1422, a signal generation device 1416 (e.g., a speaker), graphics processing unit 1422, video processing unit 1428, and audio processing unit 1432.

The data storage device 1418 may include a machine-readable storage medium 1424 (also known as a non-transitory computer-readable medium) on which is stored one or more sets of instructions 1426 or software embodying any one or more of the methodologies or functions described herein. The instructions 1426 may also reside, completely or at least partially, within the main memory 1404 and/or within the processing device 1402 during execution thereof by the computer system 1400, the main memory 1404 and the processing device 1402 also constituting machine-readable storage media.

In some implementations, the instructions 1426 include instructions to implement functionality corresponding to the present disclosure. While the machine-readable storage medium 1424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1402 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A computer-implemented method for building a library based on a circuit design, the computer-implemented method comprising:
   receiving a library comprising a set of library cells, each library cell representing a set of circuit components of circuit designs;
   receiving a circuit design;
   determining a portion of the circuit design for use as an additional library cell;
   modeling the additional library cell to estimate one or more of an electrical property and a physical property for the additional library cell, wherein modeling the additional library cell comprises:
      generating a set of possible implementations of the additional library cell using smaller primitive library cells;
      determining properties of each of the set of possible implementations of the additional library cell, the properties representing one or more of area, power or delay;
      building an electrical model for the additional library cell based on a possible implementation selected from the set of possible implementations based on the properties of the possible implementation; and
      estimating properties of the additional library cell representing one or more of area, power and delay using the electrical model of the additional library cell; and
   recommending the additional library cell for addition to the library.

2. The computer-implemented method of claim 1, further comprising:
   analyzing the set of library cells of the library to determine whether the additional library cell should be added to the library.

3. The computer-implemented method of claim 1, further comprising:
   determining values of an electrical property of library cells of the library;
   generating a mapping from library cells of the library to ranges of values of the electrical property;
   identifying one or more gaps in the library based on the mapping, wherein a gap represents a range of values of the electrical property for which the library is missing library cells; and
   determining whether to recommend the additional library cell for addition to the library based on whether the additional library cell has a value of the electrical property that fills at least a portion of the gap in the library.

4. The computer-implemented method of claim 1, further comprising:
   determining values of an electrical property of library cells of the library;
   determining a representative value of the electrical property for the library;
   identifying one or more anomalous library cells of the library, wherein each anomalous library cell has a value of the electrical property that differs from the representative value of the electrical property of the library by more than a threshold value; and
   recommending the additional library cell for replacing an anomalous library cell of the library.

5. The computer-implemented method of claim 1, further comprising:
   mapping circuit patterns in the circuit design to combinational logic functions;
   determining a frequency of occurrence of each combinational logic function in the circuit design;
   determining a strength of recommendation of a combinational logic function based on the frequency of occurrence of the combinational logic function in the circuit design; and
   recommending one of the circuit patterns as the additional library cell for including in the library based on a strength of recommendation of the combinational logic function.

6. The computer-implemented method of claim 5, further comprising:
   determining combinational logic functions that are already present in the library; and eliminating a combinational logic function of the circuit design as a candidate library cell responsive to determining that the combinational logic function exists in the library.

7. The computer-implemented method of claim 1, further comprising:
mapping circuit patterns in the circuit design to sequential logic functions, wherein a sequential logic function represents a sequential element obtained by combining one or more registers with combinational logic at an input or an output of each of the one or more registers; and
recommending one of the circuit patterns as the additional library cell for including in the library based on a strength of recommendation of the sequential logic function represented by the circuit pattern.

8. The computer-implemented method of claim 7, wherein the strength of recommendation of the sequential logic function is determined based on a frequency of occurrence of the sequential logic function in the circuit design.

9. The computer-implemented method of claim 7, further comprising:
determining sequential logic functions that are already present in the library; and
eliminating a sequential logic function of the circuit design for consideration as the additional library cell responsive to determining that the sequential logic function exists in the library.

10. The computer-implemented method of claim 1, further comprising:
receiving a placed design of a netlist corresponding to the circuit design;
identifying a plurality of circuit patterns in the placed design as additional library cells;
for each circuit pattern from the plurality of circuit patterns, estimating an expected improvement in one or more of area, power, or delay by replacing instances of the circuit pattern with a library cell;
ranking the plurality of circuit patterns based on their estimated expected improvement; and
wherein the additional library cell is determined based on a circuit pattern selected from the plurality of circuit patterns based on the ranking.

11. The computer-implemented method of claim 1, further comprising:
determining a transistor representation of the possible implementation; and
optimizing the transistor representation of the possible implementation by reducing, rearranging, or adding one or more transistors from the transistor representation to improve one or more of area, power and delay.

12. The computer-implemented method of claim 1, wherein modeling the additional library cell further comprises:
building a physical model of the additional library cell by optimizing a layout of the implementation of the additional library cell by removing one or more poly gates from poly grids of the additional library cell; and
using the physical model of the additional library cell to determine properties of the additional library cell.

13. The computer-implemented method of claim 12, wherein a primitive library cell comprises a dummy poly gate at a boundary, wherein optimizing the layout of the implementation of the additional library cell comprises removing one or more dummy poly gates from a shared boundary of poly grids that are adjacent to each other.

14. A non-transitory computer readable medium comprising stored instructions, which when executed by a processor, cause the processor to:
receive a library comprising a set of library cells, each library cell representing a reusable set of circuit components of circuit designs;
receive a circuit design comprising a placed design of a netlist corresponding to the circuit design;
determine a portion of the circuit design for use as an additional library cell, comprising:
identifying a plurality of circuit patterns in the placed design as candidate additional library cells;
for each circuit pattern from the plurality of circuit patterns, estimating an expected improvement in one or more of area, power, or delay by replacing instances of the circuit pattern with a library cell;
ranking the plurality of circuit patterns based on their estimated expected improvement; and
determining the additional library cell based on the ranking;
generate a model of the additional library cell to estimate one or more properties of the additional library cell; and
recommend the additional library cell for addition to the library.

15. A computer system comprising:
a memory storing instructions; and
a processor, coupled with the memory and to execute the instructions, the instructions when executed cause the processor to:
receive a library comprising a set of library cells, each library cell representing a reusable set of circuit components of circuit designs;
determine values of an electrical property of library cells of the library;
generate a mapping from library cells of the library to ranges of values of the electrical property;
identify one or more gaps in the library based on the mapping, wherein a gap represents a range of values of the electrical property for which the library is missing library cells; and
determine whether to recommend an additional library cell for addition to the library based on whether the additional library cell has a value of the electrical property that fills at least the gap in the library; and
recommend the additional library cell for addition to the library.

16. The computer system of claim 15, wherein the electrical property measures a drive strength of a library cell.

17. The computer system of claim 15, wherein the instructions when executed cause the processor further to:
determine a representative value of the electrical property for the library;
identify one or more anomalous library cells of the library, wherein each anomalous library cell has a value of the electrical property that differs from the representative value of the electrical property of the library by more than a threshold value; and
recommend the additional library cell for replacing an anomalous library cell of the library.

18. The computer system of claim 17, wherein the electrical property measures a rate of change of area of a library cell with respect to a drive strength of the library cell, the rate of change determined across a sequence of library cells ordered by their drive strengths.

19. The computer system of claim 17, wherein the representative value of the electrical property for the library is an average value of the electrical property for library cells of the library.

20. The non-transitory computer readable medium of claim 14, wherein a circuit pattern represents a set of gates that are located within proximity of each other in the placed design of the netlist.

* * * * *